July 19, 1966  E. F. BEATTY  3,261,435
BRAKE ADJUSTER
Filed July 8, 1964  2 Sheets-Sheet 1
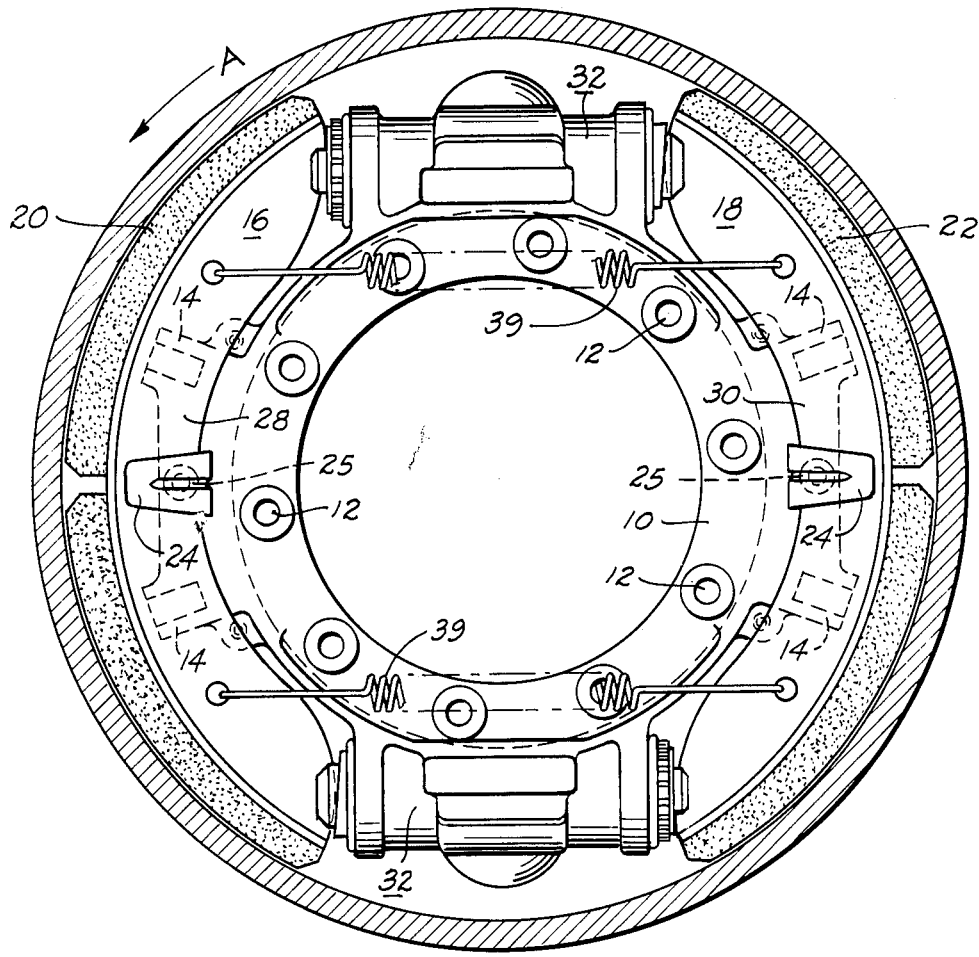
FIG_1
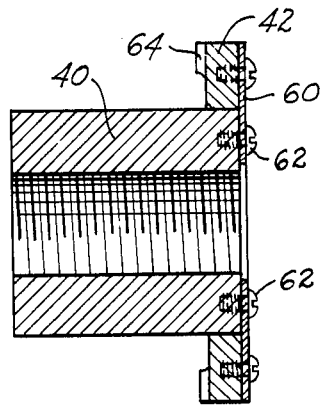
FIG_4
INVENTOR.
EUGENE F. BEATTY.
BY
*Sheldon F. Raizes*
ATTORNEY.

July 19, 1966    E. F. BEATTY    3,261,435
BRAKE ADJUSTER
Filed July 8, 1964    2 Sheets-Sheet 2
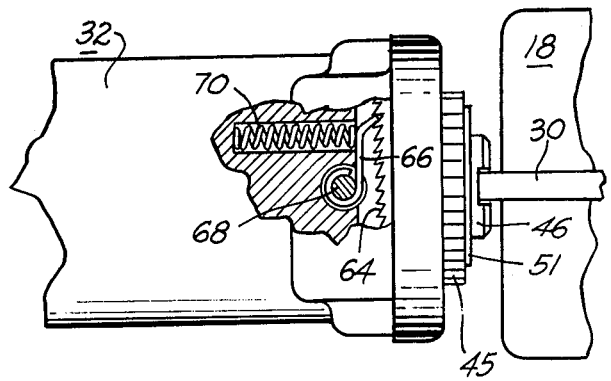
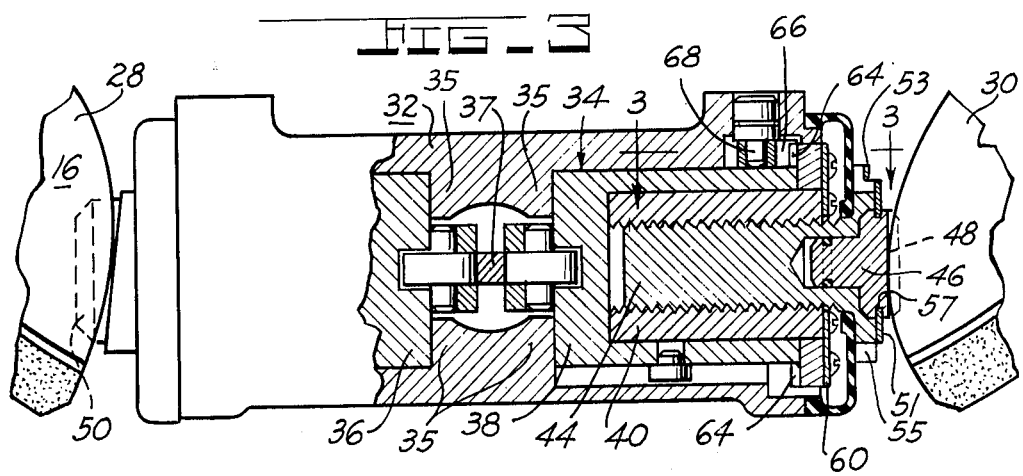
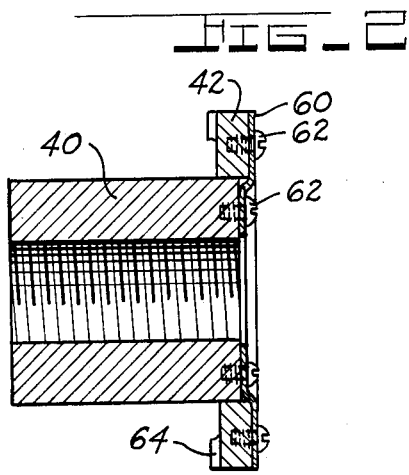
INVENTOR.
EUGENE F. BEATTY.
BY
*Sheldon F. Rages*
ATTORNEY.

United States Patent Office 3,261,435
Patented July 19, 1966

3,261,435
BRAKE ADJUSTER
Eugene F. Beatty, South Bend, Ind., assignor to The Bendix Corporation, South Bend, Ind., a corporation of Delaware
Filed July 8, 1964, Ser. No. 381,268
4 Claims. (Cl. 188—196)

This invention relates to an automatic adjuster for brakes.

More particularly, the invention concerns an automatic adjuster for a brake comprising a rotatable adjuster nut having teeth thereon, a non-rotatable adjuster screw fixed to a brake shoe and threadedly connected to the adjuster nut, and pawl means engaging the teeth to rotate the adjuster nut relative to the adjuster screw during return of the adjuster screw and the adjuster nut, as a unit, to released positon for effecting longitudinal movement of the adjuster screw.

It has been found that under certain conditions during brake actuation the adjuster screw and the adjuster nut are forced as a unit toward their released position by forces acting on their respective brake shoe. This is called "kickback." Due to the loads exerted on the adjuster screw and the adjuster nut during brake actuation, the adjuster nut is not free to rotate relatively to the adjuster screw, in response to the rotational force exerted thereon by the pawl, during "kickback" condition and thus, either the pawl or the ratchet teeth is damaged during "kickback" condition.

Accordingly, it is an object of this invention to provide an automatic adjuster with means compensating for "kickback" condition to prevent damage to the adjusting mechanism during this condition.

Another object of this invention is to construct an adjuster of the type described above which provides relative axial slidable movement between the adjuster nut and the teeth thereon to compensate for "kickback."

Another object of the invention is to construct the "kickback" compensating means so the adjuster is operable at all times when the "kickback" condition has subsided.

Other objects of the invention will become apparent from the following description with reference to the drawings, wherein:

FIGURE 1 is a front elevational view of the brake assembly;

FIGURE 2 is a front section view of the actuator and adjusting mechanism of the brake assembly of FIGURE 1, which are illustrated in shoe retracted positions;

FIGURE 3 is a partial section view taken along section line 3—3 of FIGURE 2;

FIGURE 4 is a section view of the adjuster nut, ratchet assembly in a normal operating relationship relative to each other; and FIGURE 5 is a view similar to FIGURE 4 under "kickback" condition.

Referring to FIGURE 1, the brake assembly illustrated therein has a torque spider 10 which is adapted to be mounted on a stationary part of a vehicle, such as an axle flange, by inserting bolts (not shown) through the circumferentially spaced holes 12. The torque spider has supporting ledges 14 for slidably suporting a pair of T-shaped brake shoes 16 and 18, having friction linings 20 and 22, respectively. A pair of hold-down springs 24 are each mounted to the torque spider by bolts 25 and each has a finger engaging the webs 28 and 30 of the brake shoes 16 and 18, respectively, for biasing the shoes against the supporting ledges 14. The torque spider also has a pair of diametrically opposed cylinder housings 32 formed integrally therewith, each of which contains a slidable plunger assembly 34 and a slidable plunger 36. A pair of anchor flanges 35 are located within each cylinder housing. The plunger assembly 34 and plunger 36 each abut the anchor flanges 35 during released position and one of the plunger or plunger asemblies anchor on the anchor flange 35 during braking depending upon the direction of drum rotation. The plunger assembly 34 and the plunger 36 are spread apart by a wedge member 37 which may be of any well known arrangement, such as illustrated in U.S. Patent No. 3,527,126, issued to Goepfrich. A pair of shoe-to-shoe return springs 39 return the shoes and thereby the plunger to released position.

The plunger assembly 34 comprises a hollow sleeve 38, an adjuster nut 40 carrying a toothed ratchet member 42 thereon, and an adjuster screw 44. The adjuster nut 40 has a hollow interior, the sidewalls of which are threaded for rotatably receiving the adjuster screw 44, which is T-shaped in cross section. A stud 46 is secured to the adjuster screw 44 for relative rotation therewith and has a slot 48 which slidingly receives one end of its respective brake shoe. The plunger 34 has a slot 50 at its outer end for slidably receiving one end of its respective brake shoe.

A spring clip 51, having a depending flange 53 disposed within one of a plurality of notches 55 on the outer periphery of the adjuster screw 44, has a central opening 57 with a plurality of flats which mate with flats on the stud 46 to prevent relative rotation between the stud 46 and the clip 51. Since the web 30 of the shoe 18 is disposed within the slot 48, rotation of the stud is prevented by the shoe and, therefore, rotation of the adjuster screw 44 is normally prevented since the clip 51 is unable to rotate. However, upon applying a tool to the notched periphery 55 of the screw 44, the screw 44 may be turned with the flange 53 slipping out of the notches during manual turning of the screw 44 to effect manual adjustment.

A flat annular resilient washer 60 is secured to the outer faces of the ratchet 42 and the adjuster nut 40 by a plurality of screws 62. The washer effects a rotational driving connection between the ratchet 42 and the adjuster nut and also allows relative movement in an axial direction of the bore between the ratchet 42 and the adjuster nut 40 against the resilient force of the washer 60. The ratchet member 42 has a plurality of teeth 64 on the undersurface thereof which are adapted to be engaged by a pawl 66 pivotally mounted on a pin 68 secured to the housing 32. The end of the pawl 66 is biased by a spring 70 into engagement with the teeth 64. The relationship between the pawl 66 and the teeth 64 is such that upon return of the plunger assembly to the brake release position, the pawl will effect a rotational force on the ratchet 42 tending to rotate the same in a clockwise direction. The spring force of the washer 60 is such that upon normal return movement of the plunger assembly, the ratchet and adjuster nut will remain in a normal operation position relative to each other. If the force exerted on the ratchet 42 by the pawl is greater than the spring force of the washer 60, then the washer 60 will deflect to allow relative axial movement between the adjuster nut 40 and the ratchet 42.

*Operation*

Upon actuation of the wedge 37, and assuming rotation of the drum in the direction of arrow A, the plunger assembly 34 and plunger 36 are spread apart with the shoes 16 and 18 anchoring on flanges 35 through the plunger 36. The pawl 66 is pivoted on pin 68 by the spring 70 to follow the axial movement of the teeth 64 away from the housing. If the plunger assembly 34 has moved a predetermined distance in a brake actuating direction, then the pawl 66 will pick up a new tooth on the ratchet 42 and upon release of the actuating pressure on the wedge, the return springs 39 will return the plunger assembly 34 to its normally released position against the anchoring flanges 35. During the return stroke of the plunger assembly 34 to its released position, the pawl 66 will be pivoted back toward the housing thereby exerting a clockwise rotational force on the ratchet 42. The rotational force on the ratchet 42 will me transmitted through the resilient washer 60 to the adjuster nut 40 to turn the same; thus extending the adjuster screw 44 in an axial direction a given amount effecting automatic adjustment of the brake.

However, there is a condition which is known as "kickback" wherein the brake shoe which is actuated by the plunger assembly 34 is thrust in a direction toward the brake released position during brake application. When "kickback" condition occurs, the plunger assembly 34 is being forced toward its normally released position and thus is forcing the pawl 66 to pivot in a direction toward the housing and a clockwise rotational force on the ratchet 42. However, there is too much friction between the threads on the adjuster screw 44 and the threads on the adjuster nut 40 to permit relative rotation therebetween and thus the ratchet 42 is unable to rotate. The adjuster nut 40 will be forced toward released position but the ratchet member 42 will stay in its axially applied position prior to the "kickback" condition due to the fact that the pawl 66 will be unable to pivot toward the housing since the ratchet is unable to rotate. The washer 60 will deflect allowing this relative axial movement between the adjuster nut 40 and the ratchet 42 as shown in FIGURE 5. If the "kickback" condition subsides during brake application, the adjuster nut 40 will be thrust outwards again, and the ratchet and adjuster nut will assume their normal relative positions. Assuming that the braking pressure is released and thereby terminates the "kickback" condition while the plunger assembly 34 is between its released position and its fully applied position, the return spring 39 will retract the shoes and thereby urge the plunger assembly 34 the remaining distance of its return stroke to normally released position. Since the braking pressure is released, the adjuster nut 40 is free to rotate thus allowing the pawl 66 to be pivoted by the ratchet to effect simultaneous rotation of the adjuster nut in accordance with the remaining distance of the return stroke. As a further phase of the adjustment, the washer 60 retracts ratchet 42 toward the housing thus pivoting the pawl 66 to effect rotation of the ratchet 42 and the adjuster nut 40 until the ratchet 42 and the adjuster nut 40 assume their normal operating relative positions. In this instance, the adjuster screw 44 is additionally extended in accordance to the return stroke distance the plunger assembly was thrust during "kickback" condition.

It can be seen that the resilient washer 60 serves two purposes: (1) effecting a driving connection between the ratchet and adjuster nut which permits overtravel and absorption of the force exerted by the pawl on the ratchet during "kickback" condition, and (2) it also effects rotation of the adjuster nut to conform with the automatic adjustment dictated by the pawl when the "kickback" condition terminates upon brake release.

Several modifications are illustrated in copending U.S. application Serial Nos. 376,730 and 376,732 (common assignee), filed June 22, 1964 which utilize the concept of this invention. U.S. application Serial No. 376,730 illustrates the teeth rotating on the adjuster nut against the force of a resilient spring to compensate for "kickback." U.S. application Serial No. 376,732 illustrates a pawl slidably mounted on a pin which is rotatably mounted on the housing. The pawl and pin pivot together and the pawl slides relative to the pin against the force of a resilient spring to compensate for "kickback." It is my intention to include within the scope of the following claims modifications such as illustrated by these copending applications and all equivalent applications of the invention whereby the same or substantially the same results may be obtained.

I claim:

1. In a brake: a housing member, a bore in said housing member, a plunger assembly mounted in said bore for slidable movement relative to said housing member in a brake applying direction and for return movement, said plunger assembly comprising a non-rotatable threaded member and a rotatable member threadedly secured to said non-rotatable member, a ratchet element having teeth thereon, a pawl element, one of said elements being operatively connected to said rotatable member for rotation therewith, the other of said elements being operatively connected to said housing member, resilient means urging said pawl element into engagement with said ratchet element, said elements being arranged relative to each other to effect a rotational force on said rotatable member upon normal return movement of said plunger assembly when said plunger assembly has moved in a brake applying direction beyond a predetermined distance, the operative connection between one of said elements and its respective member including resilient means separate from said first named resilient means urging said one element into a normal operating position relative to its respective member, whereby upon return of said plunger assembly, caused by "kickback," said second maned resilient means will be overcome effecting movement of said one element from its normal position relative to its respective member while said pawl element is engaged with said ratchet element.

2. In a brake: a housing member, a bore in said housing member, a plunger assembly mounted in said bore for slidable movement relative to said housing member in a brake applying direction and in a return direction, said plunger assembly comprising a non-rotatable threaded member and a rotatable member threadedly connected to said non-rotatable member, a ratchet mounted on said rotatable member for relative movement thereto, means including resilient means drivingly connecting said ratchet to said rotatable member, said resilient means urging said ratchet member into a normal operating position relative to said rotatable member, pawl means operatively connected to said housing and urged into engagement with said ratchet member, said pawl means being arranged relative to said ratchet member to impart a rotational force thereon upon return movement of said plunger assembly, whereby said rotational force imparted on said ratchet member is transmitted through said driving connection to effect rotation of said rotatable member upon normal return movement of said plunger assembly and said pawl means will effect movement of said ratchet member from its normal position relative to said rotatable member against the force of said resilient means upon return movement of said plunger assembly caused by "kickback."

3. In a brake: a housing member, a bore in said housing member, a plunger assembly mounted in said bore for slidable movement relative to said housing member in a brake applying direction and in a return direction, said plunger assembly comprising a non-rotatable threaded member and a rotatable member threadedly connected to said non-rotatable member, a ratchet mounted on said rotatable member for rotation therewith and longitudinal slidable movement on said rotatable member, resilient means urging said ratchet into a normal operating longitudinal position relative to said rotatable member, pawl means operatively connected to said housing and urged into engagement with said ratchet member, said pawl means being arranged relative to said ratchet member to impart a rotational force thereon upon return movement of said plunger assembly, whereby said rotational force imparted on said ratchet member is transmitted through said resilient means to effect rotation of said rotatable member upon normal return movement of said plunger assembly and said pawl means will effect longitudinal slidable movement of said ratchet member from its normal position relative to said rotatable member against the force of said resilient means upon return movement of said plunger assembly caused by "kickback."

4. The structure as recited in claim 3 wherein said resilient means comprises an annular washer connected at its outer circumferential portion to said ratchet member and at its inner circumferential portion to said adjuster nut.

References Cited by the Examiner
UNITED STATES PATENTS 3,068,964   12/1962   Williams et al. _____ 188—79.5

DUANE A. REGER, *Primary Examiner.*